J. J. SHUMAKER.
CONTAINER.
APPLICATION FILED OCT. 29, 1920.
1,425,908. Patented Aug. 15, 1922.
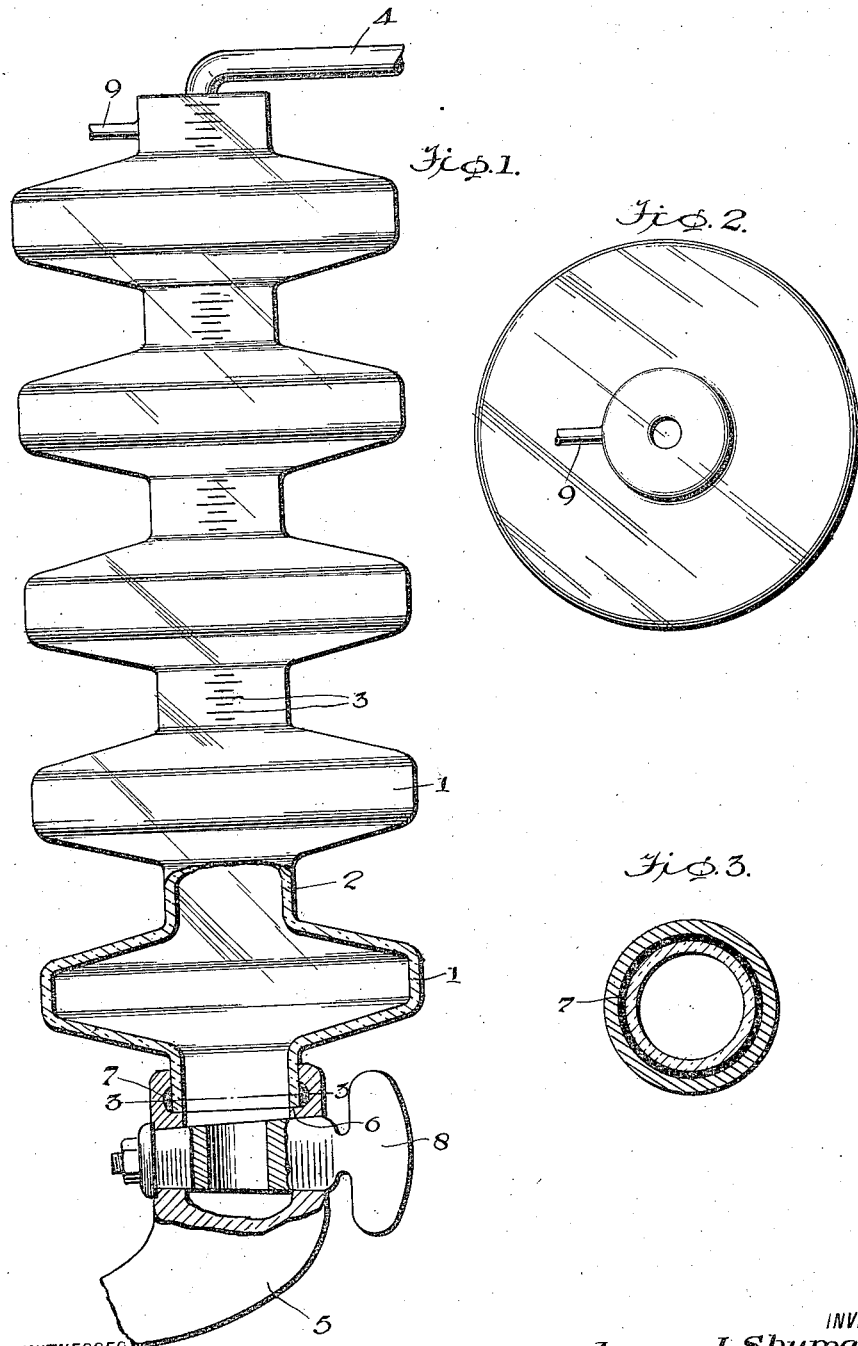
WITNESSES
R. W. Rousseau
C. E. Traina
INVENTOR
James J. Shumaker,
BY
ATTORNEYS

UNITED STATES PATENT OFFICE.

JAMES J. SHUMAKER, OF CLEVELAND, OHIO.

CONTAINER.

1,425,908.

Specification of Letters Patent. Patented Aug. 15, 1922.

Application filed October 29, 1920. Serial No. 420,543.

*To all whom it may concern:*

Be it known that I, JAMES J. SHUMAKER, a citizen of the United States, and a resident of Cleveland, in the county of Cuyahoga and State of Ohio, have invented certain new and useful Improvements in Containers, of which the following is a specification.

My invention is an improvement in containers for liquid being measured, so arranged that the container has a maximum of capacity with a minimum of cross section at the point where the measurement is taken, thus providing for accurate measuring.

In the drawings:

Figure 1 is a front view of one of the improved containers,

Figure 2 is a top plan view,

Figure 3 is a section on the line 3—3 of Figure 1.

In the present embodiment of the invention, the improved container which is of transparent material, as for instance glass or the like, consists of a series of large sections 1 and small sections 2, the sections 2 alternating with the sections 1. Thus the large sections 1 are connected by portions 2 of small cross section, and these portions 2 of small cross section are provided with graduations 3. The capacity of the portions 1 is such that each will hold very near one unit of liquid to be measured, as for instance one gallon. That is from the central graduation on one portion 2 to the central graduation of the succeeding portion 2 will indicate one unit, and that portion of the container between these two graduations will hold the said unit.

In the construction shown, the capacity of the entire container is five units, or five gallons. And the indicating graduation is at that point of the container which is of least cross section and of relatively small cross section as compared with the main portion.

The container is supplied with liquid by means of a pipe 4 delivering to the upper end thereof, and it will be noticed referring to Figure 1 that both ends of the container are reduced, that is the said ends are similar to the portions 2. The lower end of the container fits in the upper end of a pipe 5, which has at its upper end a seat 6 for receiving the lower end of the container, and a gasket 7 is arranged between the lower end of the container and the pipe 5 which is the delivery pipe. This pipe 5 carries a valve 8 for controlling the same, and an overflow pipe 9 is provided at the upper end of the container, leading to the source of supply. When for instance the container is used to dispense gasoline or other liquid fuel, and when it is desired to measure a definite quantity, as for instance two gallons, liquid is permitted to flow in the container until the liquid level reaches the graduation on the second reduced portion 2.

Because of the small cross section of the portions 2 measuring may be very accurate. When the requisite amount is in the container, the valve 8 is opened, and the liquid may flow to the place desired, as for instance a tank or container. The overflow pipe 9 is placed at the 5th unit graduation, and the container will thus hold exactly five units or five gallons. It will be obvious that it might be made to hold any desired amount, as for instance ten gallons. Since the container is of transparent material, the flow of the liquid and the level attained may be easily ascertained by inspection.

I claim:

A liquid measuring device comprising a normally vertical and elongated transparent body formed with alternate bulb-shaped containers and short narrow tubular connecting portions of a diameter substantially less than the diameter of said bulb-shaped containers, said narrow tubular connecting portions having communication at their upper and lower ends with said bulb-shaped containers and each being provided with a series of graduations, each graduation of a series indicating the capacity of the device from that graduation to the corresponding graduation of the series on the tubular portion depending from the container immediately below it.

JAMES J. SHUMAKER.